(12) United States Patent
Herington

(10) Patent No.: US 8,356,306 B2
(45) Date of Patent: Jan. 15, 2013

(54) WORKLOAD MANAGEMENT CONTROLLER USING DYNAMIC STATISTICAL CONTROL

(75) Inventor: Daniel Edward Herington, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1538 days.

(21) Appl. No.: 11/831,852

(22) Filed: Jul. 31, 2007

(65) Prior Publication Data
US 2009/0037922 A1  Feb. 5, 2009

(51) Int. Cl.
*G06F 9/46* (2006.01)
(52) U.S. Cl. ............... 718/104; 718/100; 718/102
(58) Field of Classification Search ........... 718/104, 718/102, 105, 100; 702/182
See application file for complete search history.

(56) References Cited

U.S. PATENT DOCUMENTS

| | | | |
|---|---|---|---|
| 5,721,923 A * | 2/1998 | Hamilton ............... | 718/104 |
| 6,148,335 A * | 11/2000 | Haggard et al. ......... | 709/224 |
| 6,463,454 B1 * | 10/2002 | Lumelsky et al. ....... | 718/105 |
| 7,032,119 B2 * | 4/2006 | Fung ...................... | 713/320 |
| 7,444,272 B2 * | 10/2008 | Alvarez et al. .......... | 703/2 |
| 7,467,291 B1 * | 12/2008 | Cockroft et al. ........ | 713/1 |
| 7,694,303 B2 * | 4/2010 | Hahn et al. .............. | 718/104 |
| 7,716,016 B2 * | 5/2010 | Diao et al. .............. | 702/186 |
| 7,890,630 B2 * | 2/2011 | Pullo ..................... | 709/226 |
| 2004/0252658 A1 * | 12/2004 | Hosein et al. ........... | 370/328 |
| 2004/0267897 A1 * | 12/2004 | Hill et al. ............... | 709/217 |
| 2005/0268063 A1 * | 12/2005 | Diao et al. .............. | 711/170 |
| 2006/0112093 A1 | 5/2006 | Lightstone et al. | |
| 2006/0112247 A1 * | 5/2006 | Ramany et al. ......... | 711/165 |
| 2006/0294045 A1 | 12/2006 | Suggs et al. | |
| 2007/0088532 A1 * | 4/2007 | Alvarez et al. .......... | 703/2 |
| 2007/0101173 A1 | 5/2007 | Fung | |
| 2008/0184251 A1 * | 7/2008 | Shahindoust et al. ... | 718/104 |
| 2009/0265712 A1 * | 10/2009 | Herington ............... | 718/103 |
| 2010/0002580 A1 * | 1/2010 | DelRegno et al. ....... | 370/230 |

* cited by examiner

*Primary Examiner* — Emerson Puente
*Assistant Examiner* — Willy W Huaracha

(57) ABSTRACT

A computer system comprises a workload management controller that detects and tracks resource consumption volatility patterns and automatically and dynamically adjusts resource headroom according to the volatility patterns. The controller can be hardware or a combination of software and hardware for executing the software. Also, a computer-implemented workload management method includes a computer detecting and tracking resource consumption volatility patters. The computer automatically and dynamically adjusts resource headroom according to the volatility patterns.

21 Claims, 4 Drawing Sheets

WORKLOAD MANAGEMENT CONTROLLER USING DYNAMIC STATISTICAL CONTROL

BACKGROUND

In current information technology (IT) infrastructures, servers of all capacities have unused resource headroom while running single applications. Each of the servers has associated ongoing management costs and software licensing costs that outweigh the initial, one-time investment for hardware. Typically the servers were initially deployed to handle additional growth or with little planning as to resource capacity. In any case, the servers often use only a small percentage of computing resources. For each server, a cost is attached to the unused capacity.

Workload management controllers implement tools for consolidating applications, thereby improving business value delivered to attain increased returns on server investments.

SUMMARY

An embodiment of a computer system comprises a workload management controller that detects and tracks resource consumption volatility patterns and automatically and dynamically adjusts resource headroom according to the volatility patterns.

BRIEF DESCRIPTION OF THE DRAWINGS

Embodiments of the invention relating to both structure and method of operation may best be understood by referring to the following description and accompanying drawings.

DETAILED DESCRIPTION

Figure 1:
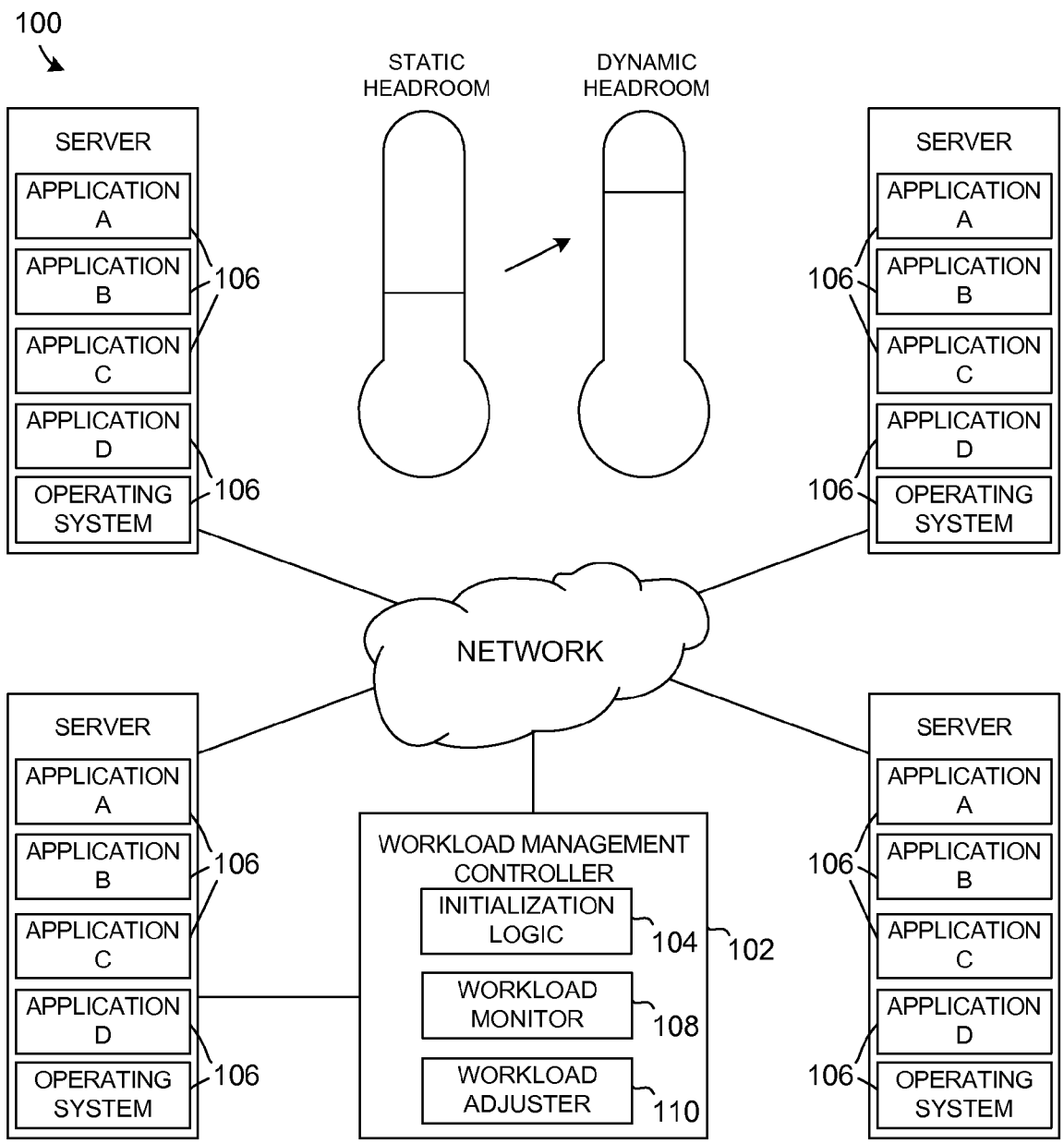
FIG. 1 is a schematic block diagram depicting an embodiment of a computer system that enhances workload management using statistical data.

Workload management systems can use typical conditions or predictive algorithms for estimating the resource usage for a workload. Because both are predictions and since resource adjustments are not performed often, workload management systems can also apply a selected amount of "headroom" to entitlements to allow for short term variations in load. A headroom determination can be static, for example with a user setting a static value or accepting a default value.

In the context of workload management, headroom can be defined as the amount of resources available for executing one or more applications that is above the amount that is actually expected to be required.

In traditional workload management systems a user configures a selected amount of headroom as a percentage of an entitlement, and the headroom value remains static throughout the lifetime of an activation of the workload management of the workload. Typically the headroom is selected to overprovision the resource which normally results in wasted resources that could otherwise be applied to other workloads.

For example, workload management systems can be implemented to operate so that a user configures a policy for each workload. The policy specifies minimum and maximum resources to be applied to the workload in combination with a goal. The goal can be utilization of a specific resource or any other measurable metric, such as response time of the workload. Because workload management systems operate on relatively coarse granularity (15-60 second intervals), a predetermined amount of headroom is imposed. The headroom is used to reduce the number of times the workload will exceed the goal as a result of short term spikes in load during an interval. For example, a global workload management (gWLM) product can be commonly configured to use central processing unit (CPU) utilization as a metric for determining when a workload needs additional resources. For example, a default value of 75% utilization can be predefined as the goal. The user can change the predefined goal value, although users commonly use the predefined default value, and the value does not change during a deployment of the policy. The 75% value is typical because a well-documented dramatic impact on the performance of workloads takes place when the system reaches 80% utilization for single-CPU core systems. Multiple-CPU systems reach the dramatic impact point at significantly higher values, for example greater than 95% on systems with 16 or more processors.

Illustrative network systems and associated methods improve workload management using statistical data.

Workload managers generally collect data at every interval to determine whether the workload meets the predefined goal and, if not, what changes to impose on entitlements to address any deviations. An illustrative computer system and associated operating methods use the collected data to determine volatility of the metric so that the headroom values can be determined with computer or processor automation and can automatically be adjusted as the volatility of the metric increases or decreases during normal running on the workload.

Embodiments of computer systems and associated operation methods are disclosed herein that use recent historical data to detect resource consumption volatility patterns for usage in automatically adjusting headroom calculations based on actual volatility of the workload.

In one example embodiment, simple standard deviation of the data can be used to determine the likelihood of a significant spike in load during the coming interval. The standard deviation value can be calculated based on short or long-term historical data, or some combination of values.

Referring to FIG. 1, a schematic block diagram depicts an embodiment of a computer system 100 that enhances workload management using statistical data, as shown by improvement in resource utilization attained by dynamic rather than static workload management. The illustrative computer system 100 comprises a workload management controller 102 that detects and tracks resource consumption volatility patterns and automatically and dynamically adjusts resource headroom according to the volatility patterns.

The workload management controller 102 can further comprise an initialization logic 104 that specifies minimum and maximum resources to be applied to one or more of multiple workloads 106 and also specifies a goal, for example a performance goal, based on a measurable metric. The initialization logic 104 also specifies an initial headroom amount which is set to reduce occurrences of a workload exceeding the goal during short term spikes in load during a tracking interval.

The workload management controller 102 can perform workload management operations including detecting and tracking one or more measurable metrics that are indicative of goal metric volatility patterns. The measurable metrics can include central processing unit (CPU) utilization, response time, number of users, workload queue length, memory consumption, input/output device usage, network input/output traffic volume, disk input/output volume, and others.

The workload management controller 102 can further comprise a workload monitor 108 that collects at least one measurable metric at selected time intervals to determine whether the workload meets a predetermined goal and determines changes in entitlements to address deviations.

The workload monitor 108 can operate by analyzing one or more measurable metrics, determining volatility of the measurable metric or metrics, and automatically determining headroom values. The entitlement is actually what is needed and appropriate for conditions plus the headroom. The reason for allocating headroom is to avoid triggering alarms when exceeding the "real" target goal.

The workload monitor 108 can determine and track volatility of multiple measurable metric variables and compute various statistical indices for the variables. For example, various difference values such as delta or change values between samples, maxima and minima within a sample range, and others can be detected and monitored to determine the existence of spikes. Typically, the statistical indices are selected for detection and thus fast response times. Entitlements can be iteratively changed based on the computed statistical indices for continuous tracking.

In an illustrative embodiment, the workload monitor 108 can determine volatility of the one or more measurable metrics by calculating a standard deviation of the measurable metric or metrics and determining likelihood of a spike in load during a subsequent time interval. In other embodiments, other statistical analyses can be performed, for example some derivative of standard deviation in combination with other values to determine the volatility calculation. In some embodiments, the workload monitor 108 can determine volatility of the one or more measurable metrics by calculating a standard deviation based on short-term or long-term historical data, or a combination of data.

The workload management controller 102 can further comprise a workload adjuster 110 that automatically adjusts headroom values as volatility of the measurable metric or metrics increases or decreases during normal workload operation.

The workload management controller 102 can detect and track resource consumption volatility patterns for resources of various types or combinations of types including central processing units (CPUs), memory, disk storage, disk input/output (I/O) interfaces, virtual machines (VMs), virtual partitions (vPar), physical partitions (nPar), and others.

The disclosed computer system 100 enables auto-configuration of the headroom value, so that a customer or user does not need to configure (or accept an arbitrary default) headroom value.

The amount of wasted headroom is reduced, increasing the value the customer receives from the available resources.

The illustrative workload management controller 102 improves resource utilization without risking significant performance impacts resulting from insufficient headroom.

Figure 2A:
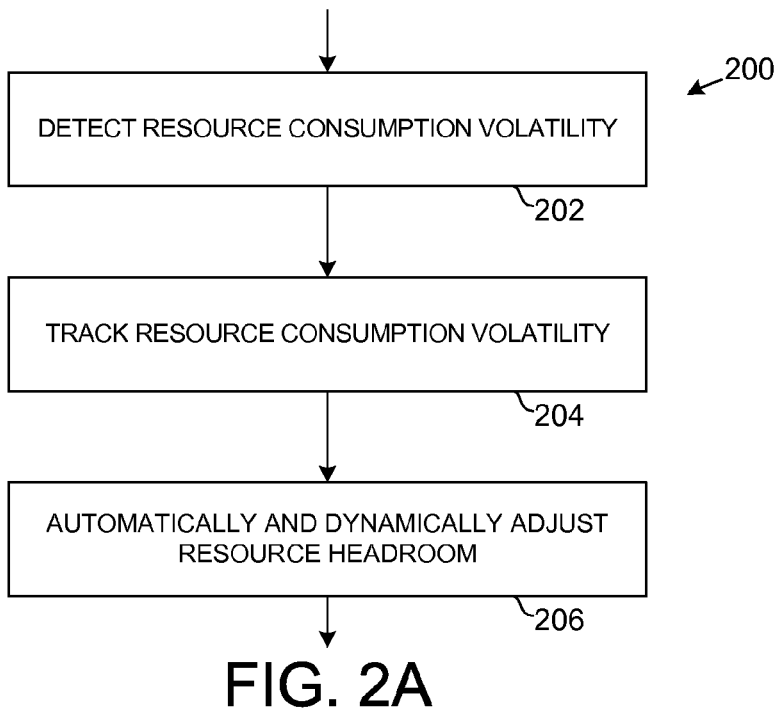
FIGS. 2A through 2E are multiple flow charts illustrating one or more embodiments or aspects of a workload management method that can improve performance and/or efficiency through usage of statistical data.

Referring to FIGS. 2A through 2E, multiple flow charts illustrate one or more embodiments or aspects of a workload management method that can improve performance and/or efficiency through usage of statistical data. Referring to FIG. 2A, an illustrative workload management method 200 comprises detecting 202 and tracking 202 resource consumption volatility patterns and automatically and dynamically adjusting 204 resource headroom according to the volatility patterns.

In some embodiments, detecting 202 and tracking 204 the measurable metric or metrics indicative of resource consumption volatility patterns can operate on one or more metrics such as central processing unit (CPU) utilization, response time, number of users, workload queue length, memory consumption, input/output device usage, network input/output traffic volume, disk input/output volume, and others.

In various embodiments, detecting 202 and tracking 204 resource consumption volatility patterns for one or more resources can be performed on resources selected from among central processing units (CPUs), memory, disk storage, disk input/output (I/O) interfaces, virtual machines (VMs), virtual partitions (vPar), physical partitions (nPar), and others.

Figure 2B:
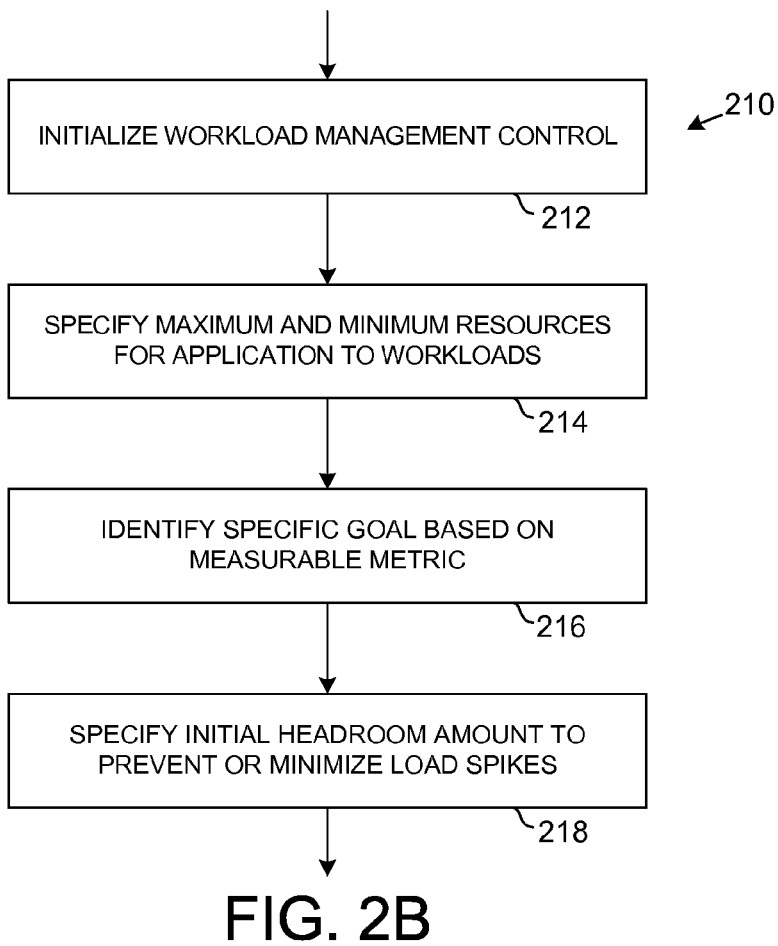

As shown in FIG. 2B, according to an aspect of one embodiment of a workload management method 210 workload management control can be initialized 212 by specifying 214 minimum and maximum resources to be applied to one or more of the multiple workloads. A specific goal based on a measurable metric can also be identified 216, along with specifying 218 an initial headroom amount which is set to reduce occurrences of workload exceeding the goal during short term spikes in load during a tracking interval.

Figure 2C:
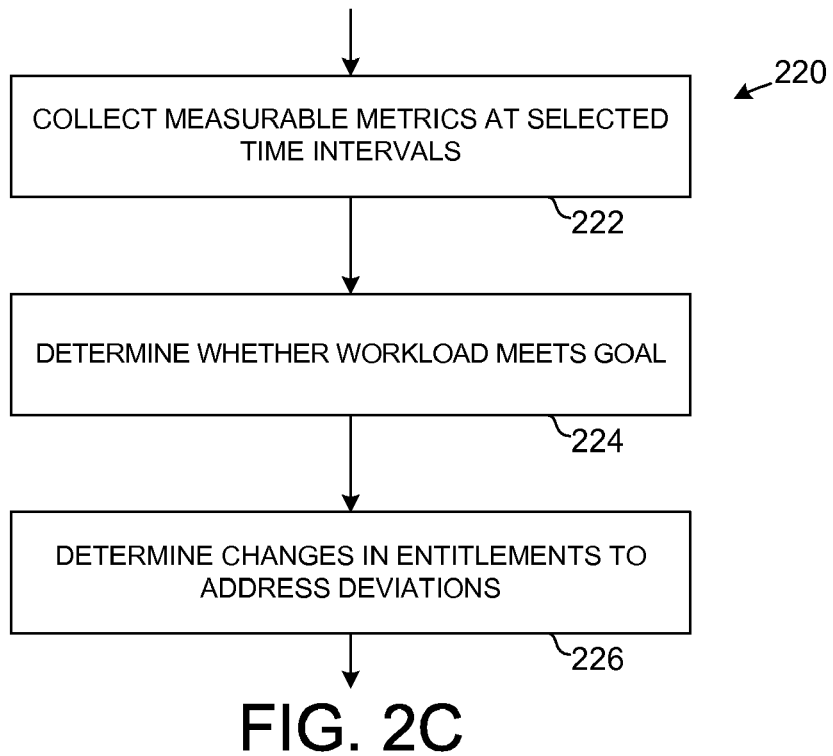

Referring to FIG. 2C, a network management method 220 can comprise collecting 222 one or more measurable metrics at selected time intervals, determining 224 whether workload meets a predetermined goal, as well as determining 226 changes in entitlements to address deviations.

Figure 2D:
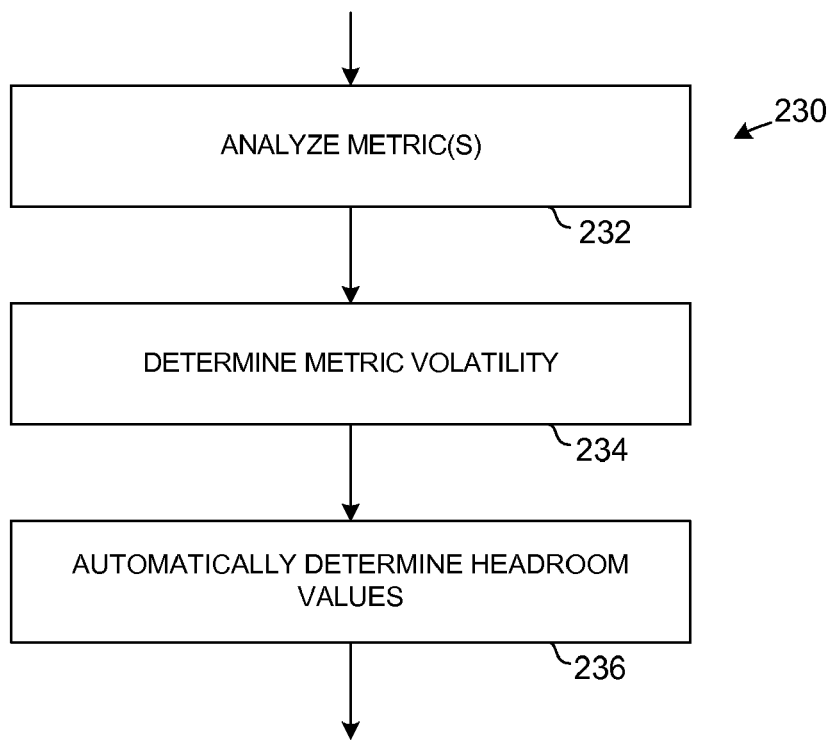

As shown in FIG. 2D, another embodiment of a network management method 230 can comprise analyzing 232 at least one measurable metric and determining 234 volatility of the metric or metrics. Headroom values can be automatically determined 236. For example, in some embodiments the headroom values can be automatically adjusted 236 as volatility of the at least one measurable metric increases or decreases during normal workload operation.

In an example embodiment, determining 236 volatility of the one or more measurable metrics can comprise calculating a standard deviation based on short-term or long-term historical data, or a combination.

Figure 2E:
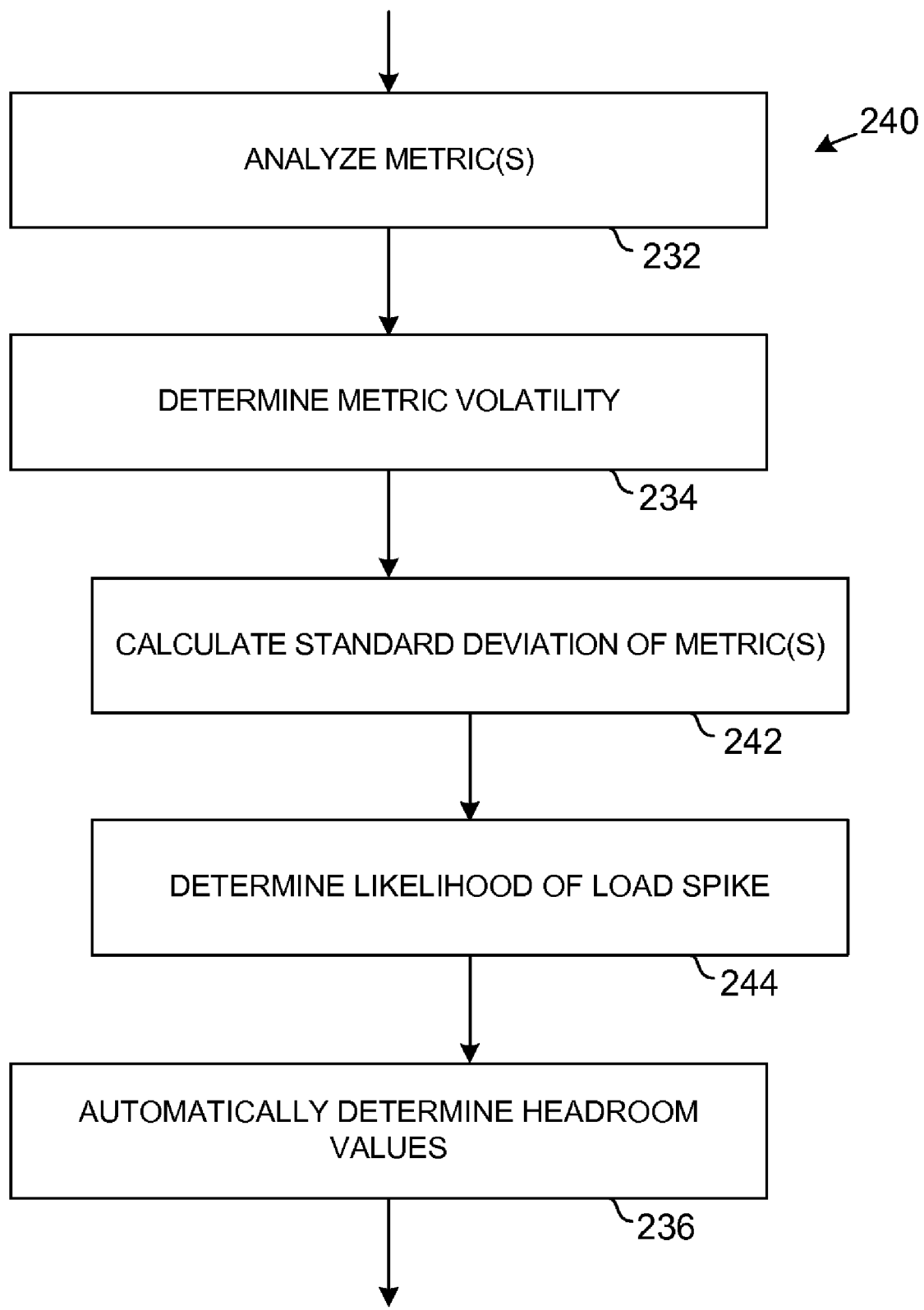

Referring to FIG. 2E, in an example implementation 240, determining 234 volatility of the at least one measurable metric can comprise calculating 242 a standard deviation of the at least one measurable metric, and determining 244 the likelihood of a spike in load during a subsequent time interval.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer system comprising:
a workload management controller that detects and tracks resource consumption volatility patterns and automatically and dynamically adjusts resource headroom according to the resource-consumption volatility patterns, the controller being a hardware controller or a combination of software and hardware executing the software, the workload management controller including a workload monitor that determines volatility of at least one measurable metric by calculating a standard deviation of the at least one measurable metric.

2. The computer system according to claim 1 further comprising:
the workload management controller further comprising an initialization logic that specifies minimum and maximum resources to be applied to ones of a plurality of workloads and a goal based on a measurable metric, and specifies an initial headroom amount for reducing a frequency of occurrences of workload demand exceeding allocated resources.

3. The computer system according to claim 1, wherein the at least one measurable metric is selected from a group consisting of central processing unit (CPU) utilization, response time, number of users, workload queue length, memory consumption, input/output device usage, network input/output traffic volume, and disk input/output volume.

4. The computer system according to claim 1 further comprising:
the workload management controller further comprising a workload adjuster that automatically adjusts headroom values as volatility of the at least one measurable metric increases or decreases during normal workload operation.

5. The computer system according to claim 1 wherein the workload management controller further determines and tracks volatility of a plurality of measurable metric variables, computing statistical indices for the variables, and iteratively changing entitlements based on the computed statistical indices.

6. The computer system according to claim 1 further comprising:
the workload management controller further comprising the workload monitor that determines volatility of the at least one measurable metric comprising calculating a standard deviation based on short-term or long-term historical data, or a combination of short-term and long-term historical data.

7. The computer system according to claim 1 wherein the workload management controller detects and tracks resource consumption volatility patterns for at least one resource selected from a group consisting of central processing units (CPUs), memory, disk storage, disk input/output (I/O) interfaces, virtual machines (VMs), virtual partitions (vPar), and physical partitions (nPar).

8. A computer-implemented workload management method comprising:
a computer detecting and tracking resource consumption volatility patterns, the tracking including determining a volatility of at least one measurable metric by calculating a standard deviation of the at least one measurable metric; and
the computer automatically and dynamically adjusting resource headroom according to the resource-consumption volatility patterns.

9. The computer-implemented workload management method according to claim 8 further comprising:
initializing workload management control comprising:
specifying minimum and maximum resources to be applied to ones of a plurality of workloads;
specifying a goal based on a measurable metric; and
specifying an initial headroom amount for reducing a frequency of occurrences of workload demand exceeding allocated resources.

10. The computer-implemented workload management method according to claim 8
wherein the at least one measurable metric is selected from a group consisting of central processing unit (CPU) utilization, response time, number of users, workload queue length, memory consumption, input/output device usage, network input/output traffic volume, and disk input/output volume.

11. The computer-implemented workload management method according to claim 8 further comprising:
collecting the at least one measurable metric at selected time intervals;
determining whether workload meets a predetermined goal; and
determining changes in entitlements to address deviations.

12. The computer-implemented workload management method according to claim 8 further comprising:
analyzing at least one measurable metric;
determining volatility of the at least one measurable metric; and
automatically determining headroom values.

13. The computer-implemented workload management method according to claim 12 further comprising:
automatically adjusting headroom values as volatility of the at least one measurable metric increases or decreases during normal workload operation.

14. The computer-implemented workload management method according to claim 12 further comprising:
determining likelihood of a spike in load during a subsequent time interval.

15. The computer-implemented workload management method according to claim 12 further comprising:
determining and tracking volatility for a plurality of measurable metric variables;
computing statistical indices for the variables; and
iteratively changing entitlements based on the computed statistical indices.

16. The computer-implemented workload management method according to claim 12 further comprising:
determining volatility of the at least one measurable metric comprising calculating a standard deviation based on short-term or long-term historical data, or a combination of short-term and long-term historical data.

17. The computer-implemented workload management method according to claim 8 further comprising:

detecting and tracking resource consumption volatility patterns for at least one resource selected from a group consisting of central processing units (CPUs), memory, disk storage, disk input/output (I/O) interfaces, virtual machines (VMs), virtual partitions (vPar), and physical partitions (nPar).

18. An article of manufacture comprising a non-transitory controller-usable medium having a computer readable program code embodied therein for workload management control, the computer readable program code including:
- a code configured to, when executed by a processor, cause the controller to detect and track resource consumption volatility patterns at least in part by determining volatility of at least one measurable metric by calculating a standard deviation of the at least one measurable metric; and
- a code configured to, when executed by a processor, cause the controller to automatically and dynamically adjust resource headroom according to the resource-consumption volatility patterns.

19. A system comprising non-transitory computer-readable media encoded with code configured to, when executed by a processor,
- track utilization by workloads of hardware resources of a computer system to yield utilization data;
- calculate respective utilization volatilities for respective workloads at least in part using said utilization data by calculating a standard deviation based on said utilization data;
- determine respective projected amounts of said hardware resources expected to be consumed by respective workloads; and
- allocate respective actual amounts of said resources to respective workloads, respective actual amounts including respective projected amounts plus respective headrooms, respective headrooms being determined as a function of respective utilization volatilities.

20. The system as recited in claim 19 further comprising said processor.

21. A computer-implemented method comprising:
- tracking utilization by workloads of hardware resources of a computer system to yield utilization data;
- calculating respective utilization volatilities for respective workloads using said utilization data, said calculating including determining a standard deviation based on said utilization data;
- determining respective projected amounts of said hardware resources expected to be consumed by respective workloads; and
- allocating respective actual amounts of said resources to respective workloads, respective actual amounts including respective projected amounts plus respective headrooms, respective headrooms being determined as a function of respective utilization volatilities.

* * * * *